United States Patent
Kim et al.

(10) Patent No.: US 10,319,527 B2
(45) Date of Patent: Jun. 11, 2019

(54) MULTILAYER CAPACITOR

(71) Applicant: SAMSUNG ELECTRO-MECHANICS CO., LTD., Suwon-si, Gyeonggi-do (KR)

(72) Inventors: Jung Min Kim, Suwon-si (KR); Bon Seok Koo, Suwon-si (KR); Chang Hak Choi, Suwon-si (KR); Hae Sol Kang, Suwon-si (KR); Ji Hye Han, Suwon-si (KR); Byung Woo Kang, Suwon-si (KR)

(73) Assignee: SAMSUNG ELECTRO-MECHANICS CO., LTD., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/661,146

(22) Filed: Jul. 27, 2017

(65) Prior Publication Data

US 2018/0286594 A1    Oct. 4, 2018

(30) Foreign Application Priority Data

Apr. 4, 2017    (KR) .................. 10-2017-0043494
Apr. 25, 2017   (KR) .................. 10-2017-0053082

(51) Int. Cl.
*H01G 4/30*        (2006.01)
*H01G 4/232*       (2006.01)
(Continued)

(52) U.S. Cl.
CPC .............. *H01G 4/33* (2013.01); *H01G 4/008* (2013.01); *H01G 4/012* (2013.01); *H01G 4/12* (2013.01);
(Continued)

(58) Field of Classification Search
CPC .......... H01G 4/33; H01G 4/008; H01G 4/012; H01G 4/12; H01G 4/232; H01G 4/248; H01G 4/30
See application file for complete search history.

(56) References Cited

U.S. PATENT DOCUMENTS

2003/0099084 A1    5/2003    Duva
2005/0012200 A1    1/2005    Sawada et al.
(Continued)

FOREIGN PATENT DOCUMENTS

JP    H10-144504 A    5/1998
JP    2001-044069 A    2/2001
(Continued)

OTHER PUBLICATIONS

Notice of Office Action issued in Korean Patent Application 10-2017-0053082, dated May 17, 2018 (English translation).
(Continued)

*Primary Examiner* — Dion Ferguson
(74) *Attorney, Agent, or Firm* — Morgan, Lewis & Bockius LLP (57) ABSTRACT

A multilayer capacitor may have a decreased equivalent series resistance (ESR) and improved warpage strength and reliability with conductive resin layers of external electrodes on surfaces where internal electrodes are exposed from a body, intermetallic compounds are in contact with conductive connecting portions of the conductive resin layers and the internal electrodes, and conductive connecting portions are in contact with a plurality of metal particles and second electrode layers.

48 Claims, 6 Drawing Sheets (51) Int. Cl.
*H01G 4/33* (2006.01)
*H01G 4/012* (2006.01)
*H01G 4/12* (2006.01)
*H01G 4/008* (2006.01)
*H01G 4/248* (2006.01)

(52) U.S. Cl.
CPC ............. *H01G 4/232* (2013.01); *H01G 4/248* (2013.01); *H01G 4/30* (2013.01)

(56) References Cited

U.S. PATENT DOCUMENTS

| | | | |
|---|---|---|---|
| 2006/0044098 A1* | 3/2006 | Kimura | H01B 1/22 336/122 |
| 2007/0128794 A1* | 6/2007 | Kusano | H01G 4/2325 438/253 |
| 2008/0123248 A1 | 5/2008 | Kunishi et al. | |
| 2008/0210564 A1* | 9/2008 | Motoki | H01G 4/012 205/122 |
| 2010/0290172 A1* | 11/2010 | Motoki | H01G 4/232 361/305 |
| 2010/0302704 A1* | 12/2010 | Ogawa | H01G 4/2325 361/306.3 |
| 2015/0213953 A1 | 7/2015 | Jun et al. | |
| 2015/0287532 A1* | 10/2015 | Abe | H05K 3/3436 174/260 |
| 2016/0027583 A1 | 1/2016 | Ahn et al. | |
| 2016/0042864 A1* | 2/2016 | Hong | H01G 4/30 361/301.4 |
| 2016/0093444 A1* | 3/2016 | Itamura | H01G 4/248 174/260 |
| 2016/0172110 A1* | 6/2016 | Otani | H01G 4/30 361/301.4 |

FOREIGN PATENT DOCUMENTS

| | | |
|---|---|---|
| JP | 2005-051226 A | 2/2005 |
| JP | 5104313 B2 | 12/2012 |
| KR | 10-2010-0020314 A | 2/2010 |
| KR | 10-2015-0089276 A | 8/2015 |
| KR | 10-2016-0012830 A | 2/2016 |
| WO | 2004053901 A1 | 6/2004 |
| WO | 2016121575 A1 | 8/2016 |

OTHER PUBLICATIONS

Notice of Office Action issued in Japanese Patent Application No. JP 2017-144018, dated Jul. 3, 2018 (English translation).

* cited by examiner

MULTILAYER CAPACITOR

CROSS-REFERENCE TO RELATED APPLICATION(S)

This application claims the benefit of priority to Korean Patent Application Nos. 10-2017-0043494 filed on Apr. 4, 2017 and 10-2017-0053082 filed on Apr. 25, 2017 in the Korean Intellectual Property Office, the disclosures of which are incorporated herein by reference in their entirety.

BACKGROUND

1. Field

The present disclosure relates to a multilayer capacitor.

2. Description of Related Art

A multilayer capacitor is an important chip component used in industries such as communications, computers, home appliances, automobiles, and the like, since it has a small size, implements high capacitance, and may be easily mounted. Multilayer capacitors are a core passive element used particularly in various electric, electronic, and information communications devices such as mobile phones, computers, digital televisions (TV), and the like.

In accordance with the miniaturization and improved performance of electronic devices, multilayer capacitors have become miniaturized, and their capacitance has increased. It has thus become important to secure high reliability in multilayer capacitors.

To secure high reliability of the multilayer capacitors, technology using a conductive resin layer in an external electrode to absorb tensile stress generated in a mechanical or thermal environment has been disclosed to prevent generation of cracks due to the tensile stress.

Such a conductive resin layer serves to electrically and mechanically bond a sintered electrode layer and a plating layer of the external electrode of the multilayer capacitor to each other. The conductive resin layer further serves to protect the multilayer capacitor from mechanical and thermal stress, depending on the process temperature and warpage impact of the circuit board when mounting the multilayer capacitor.

In the related art, due to low electrical and mechanical bonding strength of the conductive resin layer, the sintered electrode layer is used to secure electrical and mechanical bonding strength between the external electrode and an internal electrode, and the conductive resin layer is formed on the sintered electrode layer.

However, in such a structure, a crack is often generated due to the sintered electrode layer, and there is a limitation in protecting the multilayer capacitor from the mechanical and thermal stress dependent on the process temperature and warpage impact of the circuit board.

In addition, in structures according to the related art, having the conductive resin layer in direct contact with the internal electrode without using a sintered electrode layer decreases the electrical and mechanical bonding strength, which may decrease capacitance and increase equivalent series resistance (ESR).

SUMMARY

An aspect of the present disclosure may provide a multilayer capacitor with a secured capacitance, decreased equivalent series resistance (ESR), and improved reliability. The electrical and mechanical bonding strength between an internal electrode and a conductive resin layer may be improved using the conductive resin layer as a primary external electrode layer.

According to an aspect of the present disclosure, a multilayer capacitor may include a body with a plurality of first and second internal electrodes alternately stacked with dielectric layers interposed therebetween. The body may have first and second surfaces opposing each other, third and fourth surfaces opposing each other and connected to the first and second surfaces, and fifth and sixth surfaces opposing each other, connected to the first and second surfaces, and connected to the third and fourth surfaces. There may be a plurality of first and second groove portions formed between dielectric layers in the third and fourth surfaces. The dielectric layers may be perpendicular to the third and fourth surfaces. End portions of the first and second internal electrodes may be exposed from the body through the first and second groove portions, respectively. Intermetallic compounds may be in the first and second groove portions and connected to the end portions of the first and second internal electrodes, respectively. First and second external electrodes may be on the third and fourth surfaces of the body, respectively. The first and second external electrodes may include conductive resin layers on the third and fourth surfaces of the body, respectively, where the conductive resin layers each include a plurality of metal particles, conductive connecting portions surrounding the plurality of metal particles and in contact with the intermetallic compounds, and base resin. First electrode layers may be on the conductive resin layers and in contact with the conductive connecting portions.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Hereinafter, exemplary embodiments of the present disclosure will be described in detail with reference to the accompanying drawings.

Multilayer Capacitor

Figure 1:
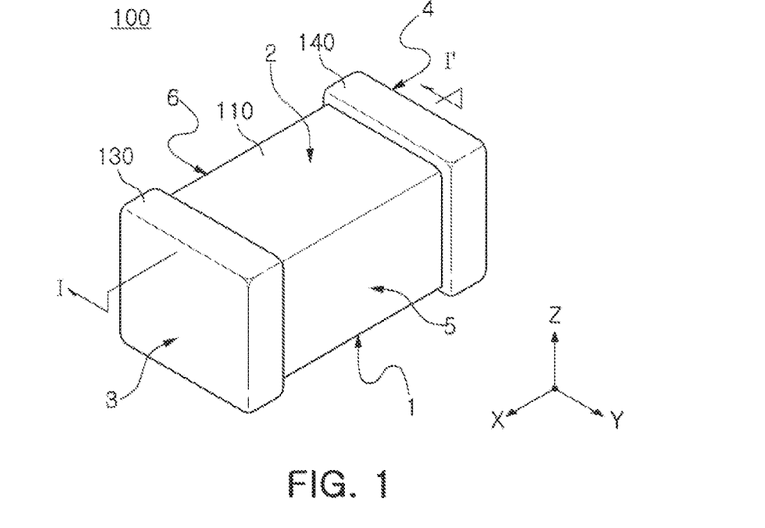
FIG. 1 is a schematic perspective view illustrating a multilayer capacitor according to an exemplary embodiment in the present disclosure.
Figure 2:
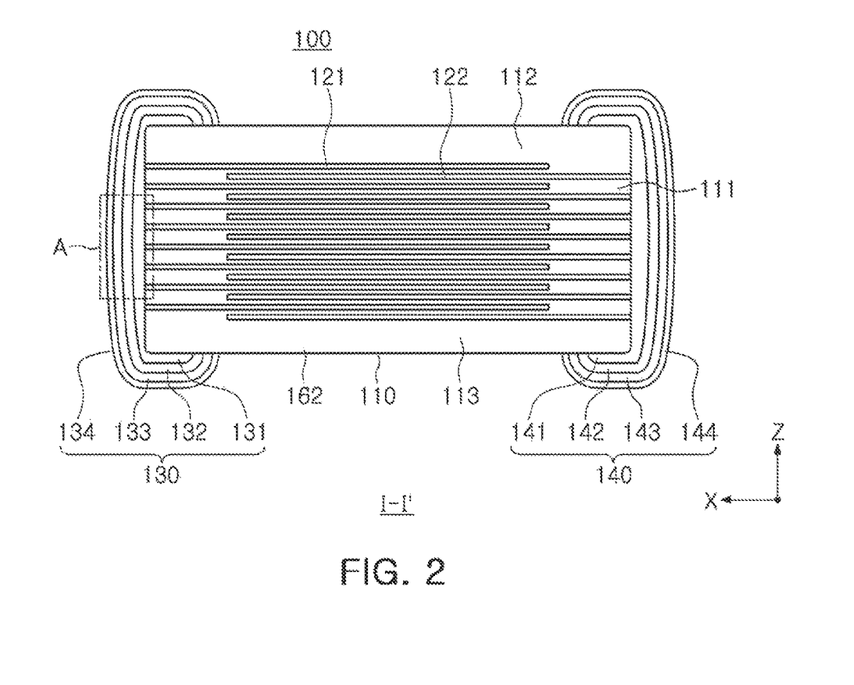
FIG. 2 is a cross-sectional view taken along line I-I' of FIG. 1.

FIG. 1 is a schematic perspective view illustrating a multilayer capacitor according to an exemplary embodiment in the present disclosure. FIG. 2 is a cross-sectional view taken along line I-I' of FIG. 1.

Referring to FIGS. 1 and 2, a multilayer capacitor 100 according to an exemplary embodiment in the present disclosure may include a body 110 and first and second external electrodes 130 and 140.

The body 110 may include an active region, which contributes to forming capacitance of the multilayer capacitor, and upper and lower covers 112 and 113 formed as upper and lower margin portions on upper and lower surfaces of the active region, respectively.

The shape of the body 110 is not particularly limited, but may be a substantially hexahedral shape.

That is, the body 110 may have a shape substantially similar to a hexahedral even though it does not have a perfect hexahedral shape, for example, due to thickness differences depending on the disposition of internal electrodes and polishing of corner portions.

Directions of a hexahedron will be defined in order to clearly describe exemplary embodiments in the present disclosure. X, Y, and Z directions in the drawings refer to a length direction, a width direction, and a thickness direction, respectively.

The thickness direction may be the same as a stacking direction in which dielectric layers are stacked.

In the body 110, first and second surfaces 1 and 2 refer to respective surfaces opposing each other in the Z direction, third and fourth surfaces 3 and 4 refer to respective surfaces connected to the first and second surfaces 1 and 2 and opposing each other in the X direction, and fifth and sixth surfaces 5 and 6 refer to respective surfaces connected to the first and second surfaces 1 and 2, connected to the third and fourth surfaces 3 and 4, and opposing each other in the Y direction. The first surface 1 may be a mounting surface.

The active region may include a plurality of dielectric layers 111 and a plurality of first and second internal electrodes 121 and 122, alternately stacked, with dielectric layers 111 interposed therebetween.

Referring to FIGS. 1-5, in the active region, a plurality of first and second groove portions may be formed between the dielectric layers in the third and fourth surfaces, respectively. The dielectric layers 111 may be perpendicular to the third and fourth surfaces 3 and 4 of the body 100 so that respective end portions of the first and second internal electrodes 121 and 122 are exposed.

Figure 3:
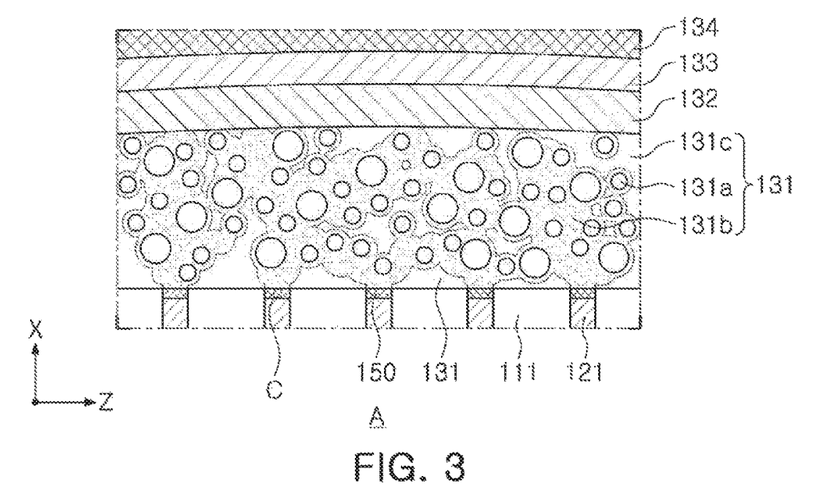
FIG. 3 is an enlarged cross-sectional view illustrating region A of FIG. 2.

Intermetallic compounds 150 may be in contact with end portions of the first and second internal electrodes 121 and 122, and may be disposed in the first and second groove portions.

The dielectric layer 111 may include ceramic powders having a high dielectric constant, such as barium titanate ($BaTiO_3$)-based powders or strontium titanate ($SrTiO_3$)-based powders. However, the material of the dielectric layer 111 according to the present disclosure is not limited thereto.

The thickness of the dielectric layer 111 may be selected in accordance with the capacitance design of the multilayer capacitor 100. The thickness of one dielectric layer 111 after being sintered may be 0.1 to 10 μm, in consideration of the size and capacity of the body 110. However, the thickness of one dielectric layer 111 according to the present disclosure is not limited thereto.

The first and second internal electrodes 121 and 122 may be disposed to face each other, with dielectric layers 111 interposed therebetween.

The first and second internal electrodes 121 and 122 are a pair of electrodes having different polarities and may be formed in a stacked direction of the dielectric layers 111, with dielectric layers 111 interposed therebetween, to be alternately exposed at the third and fourth surfaces 3 and 4 of the body 110, respectively. The first and second internal electrodes 121 and 122 may be formed by printing a conductive paste including a conductive metal at a predetermined thickness on the dielectric layers 111. The first and second internal electrodes 121 and 122 may be electrically insulated from each other by the dielectric layers 111 disposed therebetween.

Portions of the first and second internal electrodes 121 and 122 alternately exposed at the third and fourth surfaces 3 and 4 of the body 110, respectively, may be electrically connected to the first and second external electrodes 130 and 140, respectively, through the intermetallic compounds 150.

Therefore, when voltages are applied to the first and second external electrodes 130 and 140, electric charges may accumulate between the first and second internal electrodes 121 and 122. The capacitance of the multilayer capacitor 100 may be in proportion to the area of in which the first and second internal electrodes 121 and 122 overlap each other when viewed in the stacking direction.

The thicknesses of the first and second internal electrodes 121 and 122 may be determined depending on the purpose of the multilayer capacitor. For example, the thicknesses of the first and second internal electrodes 121 and 122 may be determined to be in the range of 0.2 to 1.0 μm, in consideration of a size and capacity of the body 110. However, the thicknesses of the first and second internal electrodes 121 and 122 according to the present disclosure are not limited thereto.

The conductive metal included in the first and second internal electrodes 121 and 122 may be one selected from the group consisting of nickel (Ni), copper (Cu), and palladium (Pd), or alloys thereof. However, the conductive metal included in the first and second internal electrodes 121 and 122 according to the present disclosure is not limited thereto. In the present exemplary embodiment, when the conductive metal included in the first and second internal electrodes 121 and 122 is nickel (Ni), the intermetallic compound 150 may be formed of nickel-tin (Ni—Sn).

The upper and lower covers 112 and 113 may be formed of the same material as that of the dielectric layers 111 of the active region and have the same configuration as that of the dielectric layers 111 of the active region except that they do not include the internal electrodes.

The upper and lower covers 112 and 113 may be formed by stacking one or more dielectric layers on the upper and lower surfaces of the active region, respectively, in the Z direction, and may prevent damage to the first and second internal electrodes 121 and 122 caused by physical or chemical stress.

The first and second external electrodes 130 and 140 may include conductive resin layers 131 and 141 and first electrode layers 132 and 142 disposed on the conductive resin layers 131 and 141, respectively.

The conductive resin layers 131 and 141 may be in contact with and connected to the intermetallic compounds 150 to secure electrical conduction between the first external electrode 130 and the first internal electrodes 121 and electrical conduction between the second external electrode 140 and the second external electrodes 122.

The conductive resin layers 131 and 141 may include connection portions respectively on the third and fourth surfaces 3 and 4 of the body 110, and band portions extending from the respective connection portions to portions of the first, second, fifth, and sixth surfaces 1, 2, 5, and 6 of the body 110.

Forming the conductive resin layers 131 and 141 on the third and fourth surfaces 3 and 4 of the body 110, respectively, as described above, may improve plating solution and moisture permeation prevention characteristics.

The first electrode layers 132 and 142 may be disposed on the conductive resin layers 131 and 141, respectively. The first electrode layers 132 and 142 may respectively be in contact with conductive connecting portions, to be described below, of the conductive resin layers 131 and 141. Therefore, the first electrode layers 132 and 142 may further improve the plating solution and moisture permeation prevention characteristics.

The first electrode layers 132 and 142 may include a metal component, which may be one selected from the group consisting of copper (Cu), tin (Sn), nickel (Ni), palladium (Pd), and gold (Au), or alloys thereof, but is not limited thereto.

The first electrode layers 132 and 142 may be formed by plating copper or may be formed by a thin film deposition process such as chemical vapor deposition (CVD), physical vapor deposition (PVD), or the like.

FIG. 3 is an enlarged cross-sectional view illustrating region A of FIG. 2.

An enlarged view of a portion of the first external electrode 130 is illustrated in the region A, and a description will hereinafter be provided in relation to the first external electrode 130. However, this description may be considered as including, also, a description of the second external electrode 140, since the configuration of the first external electrode 130 is similar to that of the second external electrode 140, except that the first external electrode 130 is electrically connected to the first internal electrodes 121 and the second external electrode 140 is connected to the second internal electrodes 122.

As illustrated in FIG. 3, the conductive resin layer 131 of the first external electrode 130 may include a plurality of metal particles 131a, a conductive connecting portion 131b in contact with the intermetallic compounds 150, and a base resin 131c.

The conductive resin layer 131 may serve to electrically and mechanically bond the intermetallic compounds 150 and the first electrode layer 132 to each other. The conductive resin layer 131 may also prevent the generation of cracks when mounting the multilayer capacitor 100 on a board by absorbing tensile stress generated in the mechanical or thermal environment at the time of mounting. The conductive resin layer 131 may also serve to protect the multilayer capacitor 100 from warpage impact on the board.

The conductive resin layer 131 may be formed by applying a paste having the plurality of metal particles 131a dispersed in the base resin 131c to the third surface 3 of the body 110, and then drying and hardening the paste.

Unlike forming the external electrode by sintering according to the related art, the metal particles are not completely melted and may be present in a form in which they are randomly dispersed in the base resin 131c and may be included in the conductive resin layer 131.

The metal particles 131a may not be present in the conductive resin layer 131 when they react to both low melting point metals forming the conductive connecting portion 131b and the intermetallic compounds 150.

However, for convenience of explanation, a case where the metal particles 131a are present in the conductive resin layer 131 will hereinafter be illustrated and described in the present exemplary embodiment.

The metal particles 131a may include at least one selected from the group consisting of copper (Cu), nickel (Ni), silver (Ag), copper (Cu) coated with silver, and copper coated with tin (Sn).

The metal particles 131a may have a size of 0.2 to 20 μm.

Figure 4:
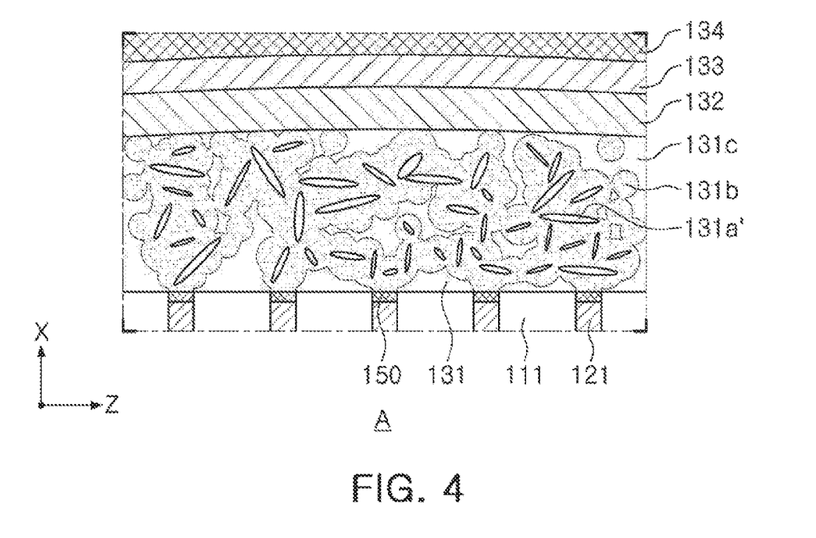
FIG. 4 is an enlarged cross-sectional view of region A of FIG. 2 illustrating metal particles having flake shapes.
Figure 5:
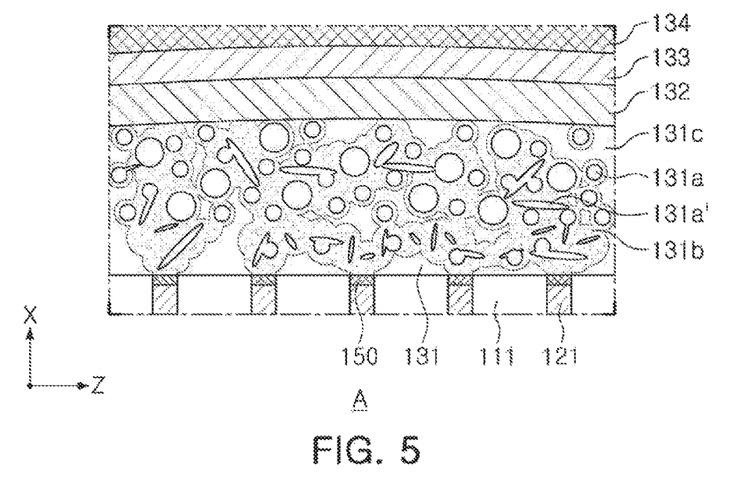
FIG. 5 is an enlarged cross-sectional view of region A of FIG. 2 illustrating mixtures of metal particles having spherical shapes and metal particles having flake shapes.

The metal particles included in the conductive resin layer 131 may be metal particles having spherical shapes, may be only metal particles 131a' having flake shapes, as illustrated in FIG. 4, or may be mixtures of metal particles 131a having spherical shapes and metal particles 131a' having flake shapes, as illustrated in FIG. 5.

The conductive connecting portion 131b may surround the plurality of metal particles 131a in a metal melted state, to connect the plurality of metal particles 131a to one another, which may significantly decrease the internal stress of the body 110 and may improve the high temperature load and moisture resistance load characteristics.

The conductive connecting portion 131b may increase electrical conductivity of the conductive resin layer 131, to decrease resistance of the conductive resin layer 131.

Where the metal particles 131a are included in the conductive resin layer 131, the conductive connecting portion 131b may serve to increase connectivity between the metal particles 131a to further decrease the resistance of the conductive resin layer 131.

The low melting point metal included in the conductive connecting portion 131b may have a melting point lower than a hardening temperature of the base resin 131c.

The low melting point metal included in the conductive connecting portion 131b may have a melting point of 300° C. or lower.

The metal included in the conductive connecting portion 131b may be an alloy of two or more selected from the group consisting of tin (Sn), lead (Pb), indium (In), copper (Cu), silver (Ag), and bismuth (Bi).

Where the metal particles 131a are included in the conductive resin layer 131, the conductive connecting portion 131b may surround the plurality of metal particles 131a in a melted state, to connect the plurality of metal particles 131a to one another.

Since the low melting point metal included in the conductive connecting portion 131b has a lower melting point than the hardening temperature of the base resin 131c, the low melting point metal may melt in the drying and hardening processes, and the conductive connecting portion 131b may cover the metal particles 131a in the melted state, as illustrated in FIG. 3.

The conductive resin layer 131 may be formed by manufacturing a low melting point solder resin paste and then dipping the body in the low melting point solder resin paste. When silver or a metal coated with silver is used as the material of the metal particle 131a when manufacturing the low melting point solder resin paste, the conductive connecting portion 131b may include $Ag_3Sn$.

The first and second internal electrodes 121 and 122 may include nickel (Ni), and the intermetallic compounds 150 may include nickel-tin (Ni—Sn).

When a paste in which the metal particles are dispersed is used as an electrode material, the flow of electrons is smooth where metals are in contact, but may rapidly decrease where the base resin surrounds the metal particles.

In order to solve this problem, the amount of base resin may be significantly decreased and the amount of metal may be increased, to increase a contact ratio between the metal particles and improve conductivity. However, the adhesive strength of the external electrode may decrease due to the decreases amount of base resin.

In the present exemplary embodiment, even though the amount of thermosetting resin is not significantly decreased, the contact ratio between the metal particles may be increased by the conductive connecting portion, such that the adhesive strength of the external electrode may not decrease and the electrical conductivity in the conductive resin layer may be improved. Therefore, equivalent series resistance (ESR) of the multilayer capacitor may be decreased.

The intermetallic compounds 150 may be disposed in the first groove portions and in contact with the conductive connecting portion 131b, to connect the first internal electrode 121 to the conductive connecting portion 131b. The exposed surfaces of the intermetallic compounds 150 may form one substantially flat surface with the third surface 3 of the body. In another exemplary embodiment, the intermetallic compounds 150 may be further formed in the conductive resin layer 131.

Therefore, the intermetallic compounds 150 may serve to improve electrical and mechanical bonding, and decrease contact resistance, between the conductive resin layers 131 and 141 and the first or second internal electrode 121 or 122, respectively.

The base resin 131c may include a thermosetting resin having an electrical insulating property.

The thermosetting resin may be, for example, an epoxy resin, but is not limited thereto.

The base resin 131c may serve to mechanically bond the body 110 and the first electrode layer 132 to each other.

Second electrode layers may be further disposed on the first electrode layers 132 and 142.

The second electrode layers may be plating layers, and may have, for example, a structure in which nickel (Ni) plating layers 133 and 143 and tin (Sn) plating layers 134 and 144 are stacked sequentially on the first electrode layers 132 and 142, respectively. The second electrode layers may also be formed using nickel or tin by a thin film deposition process such as chemical vapor deposition (CVD), physical vapor deposition (PVD), or the like.

Mechanism of Forming a Conductive Resin Layer

Figure 6:
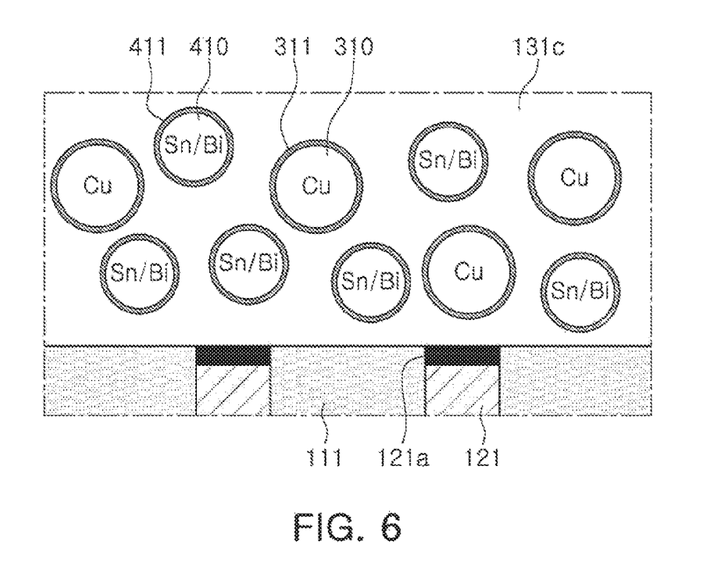
FIG. 6 is a diagram illustrating copper particles and tin/bismuth particles dispersed in epoxy.
Figure 7:
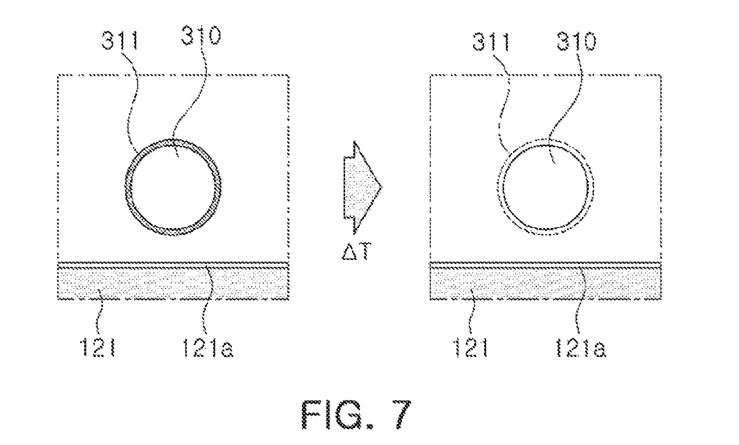
FIG. 7 is a diagram illustrating an oxide film of a copper particle removed by an oxide film remover or heat.
Figure 8:
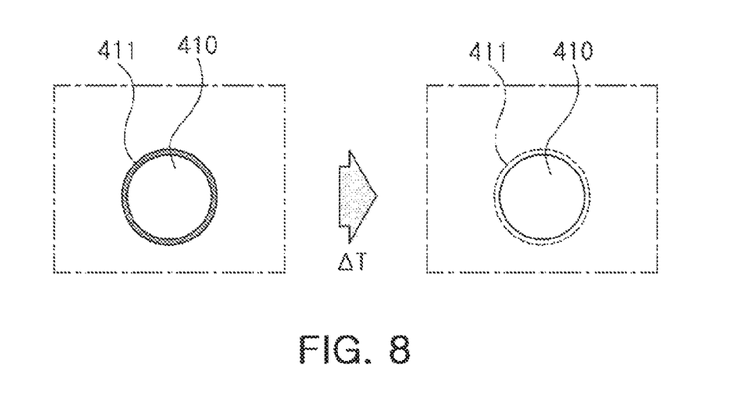
FIG. 8 is a diagram illustrating an oxide film of a tin/bismuth particle removed by an oxide film remover or heat.
Figure 9:
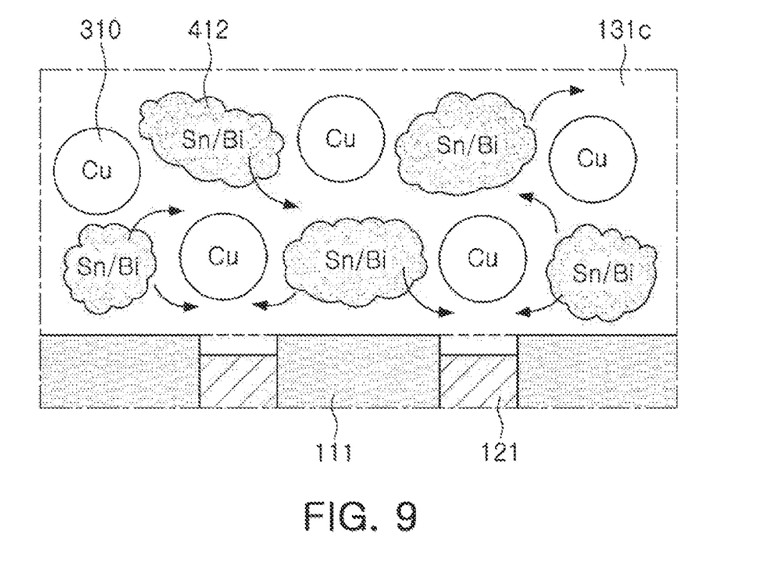
FIG. 9 is a diagram illustrating tin/bismuth particles melted to have flowability.
Figure 10:
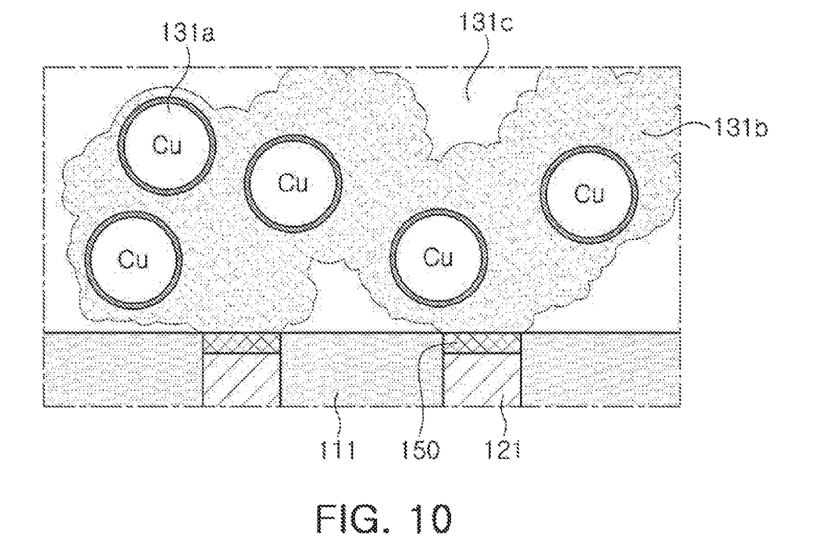
FIG. 10 is a diagram illustrating copper particles and tin/bismuth particles reacting to each other to form intermetallic compounds.

FIG. 6 is a diagram illustrating copper particles and tin/bismuth particles dispersed in epoxy. FIG. 7 is a diagram illustrating an oxide film of a copper particle removed by an oxide film remover or heat. FIG. 8 is a diagram illustrating an oxide film of a tin/bismuth particle removed by an oxide film remover or heat. FIG. 9 is a diagram illustrating tin/bismuth particles melted to have flowability. FIG. 10 is a diagram illustrating copper particles and tin/bismuth particles reacting to each other to form copper-tin layers.

The mechanism for forming the conductive resin layer 131 will hereinafter be described with reference to FIGS. 6 through 10.

The conductive resin layer according to the present exemplary embodiment may include a plurality of metal particles, a low melting point metal, and a base resin. The metal particles may be nickel particles, silver particles, copper particles coated with silver, tin particles, or copper particles coated with tin. Copper particles are used as the metal particles, by way of example, in the present exemplary embodiment.

A tin-based (Sn) solder may be used as the low melting point metal, and tin/bismuth particles (Sn/Bi) are used as the low melting point metal in the present exemplary embodiment. However, Sn—Pb, Sn—Cu, Sn—Ag, Sn—Ag—Cu, or the like, may also be used as the low melting point metal. An epoxy resin is used as the base resin in the present exemplary embodiment.

Referring to FIGS. 6 through 8, copper (Cu) particles 310, which are metal particles having a high melting point, and tin/bismuth (Sn/Bi) particles 410, which are metal particles having a low melting point, are included in the epoxy resin used as the base resin 131c. The copper and tin-bismuth particles 310 and 410 may have oxide films 311 and 411 present on surfaces thereof, respectively. The first internal electrodes 121 may have oxide films 121a present on surfaces thereof.

The oxide films 311 and 411 may hinder copper-tin layers from being formed by a reaction between the copper particles 310 and the tin/bismuth particles 410, and may be removed by an oxide film remover, included in epoxy or heat (ΔT) at the time of performing a hardening process, or by acid solution processing. The oxide films 121a of the first internal electrodes 121 may also be removed.

The oxide film remover may be an acid, a base, hydrogen halide, or the like, but is not limited thereto.

Referring to FIGS. 9 and 10, the tin/bismuth particles from which the oxide films are removed may start melting at about 140° C. The melted tin/bismuth particles 412 may have flowability and may move toward the copper particles 310 from which the oxide films are removed. The melted tin/bismuth particles 412 may react to the copper particles 310 at a predetermined temperature to form the conductive connecting portion 131b and may move toward the first groove portions of the body 110 in which the first internal electrodes 121 are exposed to form the intermetallic compounds 150, which are the copper-tin layers in the first groove portions, as illustrated in FIG. 10.

The intermetallic compounds 150 formed as described above may be connected to the conductive connecting portion 131b formed of copper-tin, of the conductive resin layer, to decrease contact resistance between the first internal electrodes 121 and the conductive resin layer.

The copper particles 131a illustrated in FIG. 10 are copper particles present in the conductive connecting portion 131b after the reaction described above.

Surface oxidation may be generated easily on the tin/bismuth particles 412 and may hinder the intermetallic compounds 150 from being formed. Therefore, the tin/bismuth particles may be surface-treated so that a content of carbon is 60.5% to 1.0% in order to prevent surface oxidation.

The sizes of the metal particles for forming the intermetallic compounds may be 0.2 to 20 μm. The metal particles may be one of nickel particles, silver particles, copper particles coated with silver, copper particles coated with tin, and copper particles.

In order to form the intermetallic compounds, the tin/bismuth particles, melted at a predetermined temperature to be present in a solution state, need to flow to the groove portions of the body and surround the metal particles. However, when the metal particles exceed 20 m in size, the interval between the body and the metal particles may be excessively large, such that a tin/bismuth solution may not easily move between the groove portions of the body and the metal particles, thereby hindering the intermetallic compounds from being formed.

In contrast, when the metal particles are 20 μm or less in size, the distance between metal particles may be decreased, and the tin/bismuth solution may more easily move to the groove portions of the body, due to capillary force generated in regions in which the distance between the metal particles is decreased, such that the intermetallic compounds may be easily formed.

When the sizes of the metal particles are less than 0.2 μm, however, oxidation may be generated on surfaces of the metal particles, which may hinder the intermetallic compounds from being formed.

In addition, in the present mechanism, the melting temperature of the tin-bismuth particles and the forming temperature of the intermetallic compounds need to be lower than a hardening temperature of the epoxy resin, which is the base resin.

When the melting temperature of the tin-bismuth particles and the forming temperature of the intermetallic compounds are higher than the hardening temperature of the epoxy resin, the base resin may first be hardened, such that the melted tin-bismuth particles may not move to the surfaces of the copper particles, and thus the copper-tin layers, which are the intermetallic compounds, may not be formed.

The content of the tin-bismuth particles for forming the intermetallic compounds may be 10 to 90 wt %, with respect to total metal particles.

When the content of the tin-bismuth particles is less than 10 wt %, the sizes of the intermetallic compounds formed by the reaction between the tin-bismuth particles and the metal particles may excessively increase, such that it may be difficult to form the intermetallic compounds in the groove portions of the body and it may be difficult to dispose the conductive connecting portion on the third or fourth surface of the body.

When the content of the tin-bismuth particles exceeds 90 wt %, the tin-bismuth particles may react to each other, such that only the sizes of the tin-bismuth particles may increase, without forming intermetallic compounds.

In addition, the content of tin in the tin-bismuth particles may need to be adjusted.

In the present exemplary embodiment, the component reacting to the metal particles to form the intermetallic compounds may be tin, and thus the content (x) of Sn in $Sn_x$—$Bi_y$ may be 10 wt % or more, with respect to total metal particles, in order to secure a predetermined level or more of reactivity.

When the content (x) of Sn is less than 10 wt %, with respect to the total metal particles, the ESR of the manufactured multilayer capacitor may be increased.

In a multilayer capacitor where a conductive resin layer is used in the external electrode, the ESR may be affected by several kinds of resistance components applied to the external electrode.

These resistance components may include resistance of the internal electrode, contact resistance between the conductive resin layer and the internal electrode, resistance of the conductive resin layer, contact resistance between the first electrode layer and the conductive resin layer, and resistance of the first electrode layer.

The resistance of the internal electrode and the resistance of the first electrode layer are fixed values and are not varied.

According to the present exemplary embodiment, a sintered electrode layer is not present between the external electrode and the body, to solve the problem of bending stress of a sintered electrode layer generated when bending the chip according to the related art. In addition, the process temperature may be lowered to prevent cracks generated in the body.

The bonding strength of the external electrode may be increased by the intermetallic compounds to further improve warpage strength of the multilayer capacitor compared to having a sintered electrode layer in the outermost side of the external electrode.

Furthermore, electrical connectivity between the internal electrode and the conductive resin layer may be improved by the intermetallic compounds. Therefore, contact resistance may be decreased, to further decrease the ESR of the multilayer capacitor.

External electrodes of a multilayer capacitor according to the related art have a structure where a copper (Cu) paste is applied to both end surfaces of a body with exposed internal electrodes and is then sintered to form electrode layers. Nickel (Ni) plating layers are then formed on the electrode layers, in order to prevent solders from being dissolved, and tin (Sn) plating layers are formed on the nickel plating layers in order to improve wettability of the solders when a chip board is present on the nickel plating layers.

In that case, the nickel plating layer may prevent permeation of external moisture into the tin plating layer, but may not sufficiently prevent permeation of a plating solution or moisture, due to a small defect of the nickel plating layer.

In the multilayer capacitor according to the present exemplary embodiment, a primary external electrode is formed using a low melting point metal resin highly resistant to permeation of plating solution and moisture.

The low melting point metal resin electrode may have excellent electrical connectivity since a low melting point metal is used to form internal electrodes (e.g., Ni electrodes) and intermetallic compounds ("IMCs") in a low temperature hardening process.

The IMCs may be formed in the low melting point metal resin electrode to suppress the permeation of plating solution and external moisture.

A copper (Cu) electrode layer is formed as a secondary external electrode by a plating process, in order to further improve the plating solution and moisture permeation prevention characteristics.

Since the copper electrode layer formed by plating has a high electrode density, the copper electrode layer may further improve the plating solution and moisture permeation prevention characteristics, as compared with a sintered copper electrode layer.

A nickel (Ni) plating layer may then be formed to prevent the solder from dissolving, and a tin (Sn) plating layer may be formed to improve the wettability of the solder.

Since the process of forming the external electrode as described above may be performed at 250° C. or less, a waterproof coating process for preventing the permeation of the moisture may be used.

Since the thickness of the primary external electrode, which is the low melting point metal resin electrode, may be decreased as compared to an existing sintered Cu electrode due to the improved plating solution and external moisture permeation prevention characteristics, the effective area and capacitance of the chip may be improved.

According to the present exemplary embodiment, the primary electrode layer of the external electrode may be a low melting point metal resin layer, a secondary electrode layer of the external electrode may be a copper electrode layer, a tertiary electrode layer of the external electrode may be a nickel electrode layer, and a quaternary electrode layer of the external electrode may be a tin electrode layer.

Modified Example

Figure 11:
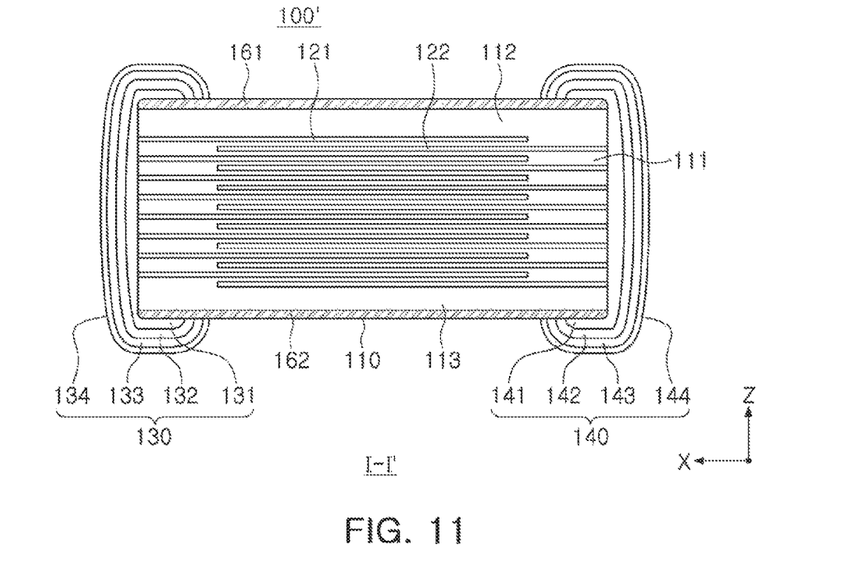
FIG. 11 is a schematic cross-sectional view illustrating a multilayer capacitor according to another exemplary embodiment in the present disclosure.

Referring to FIG. 11, a multilayer capacitor 100' according to another exemplary embodiment in the present exemplary may include moisture permeation prevention layers 161 and 162 formed, respectively, on the first and second surfaces 1 and 2 of the body 110.

A detailed description of structures similar to those of the multilayer capacitor according to the exemplary embodiment described above will be omitted in order to avoid overlapping descriptions. The moisture permeation prevention layers 161 and 162, corresponding to a structure different from that of the multilayer capacitor according to the exemplary embodiment described above, will be illustrated and described in detail.

The moisture permeation prevention layers 161 and 162 may be organic layers or inorganic layers formed of parylene, $Al_2O_3$, $SiO_2$, or the like. The moisture permeation prevention layers 161 and 162 may be formed by dipping, coating, and using a thin film deposition process such as chemical vapor deposition (CVD)/physical vapor deposition (PVD), an atomic layer deposition (ALD), or the like.

In the present exemplary embodiment, conductive resin layers are formed as internal layers in contact with the third and fourth surfaces 3 and 4 of the body 110, and a low melting point metal, on which a process may be performed at a low temperature, is used as the material of the conductive resin layers, such that organic layers that may not be used at a high process temperature may be used as the moisture permeation prevention layers.

The moisture permeation prevention layers 161 and 162 may significantly improve reliability of the multilayer capacitor.

Method of Manufacturing the Multilayer Capacitor

A method of manufacturing a multilayer capacitor according to an exemplary embodiment in the present disclosure will hereinafter be described in detail, but the present disclosure is not limited thereto, and overlapping descriptions will be omitted.

In the method of manufacturing a multilayer capacitor according to the present exemplary embodiment, a slurry including powders such as barium titanate ($BaTiO_3$) powders, or the like, may be applied to carrier films and dried to prepare a plurality of ceramic green sheets, resulting in the formation of dielectric layers and covers.

The ceramic green sheets may be manufactured by mixing ceramic powders, a binder, and a solvent together to prepare a slurry, and manufacturing the slurry in a sheet shape, having a thickness of several micrometers, by a doctor blade method.

A conductive paste for an internal electrode, including a conductive metal such as copper, or the like, may be applied to the ceramic green sheets by a screen printing method, or the like, to form the internal electrodes.

A plurality of ceramic green sheets on which the internal electrodes are printed may be stacked, and a plurality of ceramic green sheets on which the internal electrodes are not printed may be stacked on upper and lower surfaces of a laminate and then sintered to prepare a body. The internal electrodes may include first and second internal electrodes having different polarities.

That is, the body may include the dielectric layers, the first and second internal electrodes, and the covers. The dielectric layers may be formed by sintering the ceramic green sheets on which the internal electrodes are printed, and the covers may be formed by sintering the ceramic green sheets without internal electrodes.

The body may have first and second surfaces opposing each other, third and fourth surfaces connected to the first and second surfaces and opposing each other, and fifth and sixth surfaces opposing each other, connected to the first and second surfaces, connected to the third and fourth surfaces, and which may include a plurality of first and second groove portions formed between the dielectric layers in the third and fourth surfaces, respectively. The dielectric layers may be perpendicular to the third and fourth surfaces so that end portions of the first and second internal electrodes are exposed to respective sides of the body.

A conductive resin composite including metal particles, a thermosetting resin, and a low melting point metal, having a lower melting point than the thermosetting resin, may be prepared.

The conductive resin composite may be prepared by mixing, for example, copper particles as the metal particles, tin/bismuth particles as the low melting point metal, an oxide film remover, and 4 to 15 wt % of epoxy resin together, and then dispersing them using a 3-roll mill.

The conductive resin composite may be applied to the third and fourth surfaces of the body and then be dried and hardened to form conductive resin layers having conductive connecting portions surrounding melted low melting point metals.

When forming the conductive resin layers, oxide films on the surfaces of the metal particles and the low melting point metals in the thermosetting resin may be removed. The metal particles and low melting point metals from which the oxide films are removed may react to each other to allow the conductive connecting portions to be formed. The low melting point metals may have flowability to flow to the first and second groove portions of the body and thereby form intermetallic compounds in contact with end portions of the first and second internal electrodes and formed of copper-tin, or the like, in the first and second groove portions.

When some of the metal particles do not completely react to the low melting point metals, such that they remain, the remaining metal particles may be present in the conductive resin layers covered by the melted low melting point metals.

The metal particles may include at least one selected from the group consisting of copper, nickel, silver, copper coated with silver, and copper coated with tin, but are not limited thereto.

The low melting point metal may be at least one selected from the group consisting of Sn/Bi, Sn—Pb, Sn—Cu, Sn—Ag, and Sn—Ag—Cu, but is not limited thereto.

The thermosetting resin may include an epoxy resin, but is not limited thereto and may be, for example, a bisphenol A resin, a glycol epoxy resin, a novolak epoxy resin, or a resin that is in a liquid state at room temperature, due to a small molecular weight among derivatives thereof.

First electrode layers electrically connected to the conductive resin layers may be formed on the conductive resin layers.

The first electrode layers may be formed by applying and then sintering a paste including a conductive metal and glass.

The conductive metal is not particularly limited, but may be, for example, one or more selected from the group consisting of copper, nickel, palladium, gold, silver, and alloys thereof.

The glass is not particularly limited, but may be a material having the same composition as that of glass used to manufacture an external electrode of an existing multilayer capacitor.

Second electrode layers may be further formed on the first electrode layers. The second electrode layers may be formed by plating, and may include, for example, nickel plating layers and tin plating layers further formed on the nickel plating layers.

Moisture permeation prevention layers may be formed on the first and second surfaces of the body, respectively, before the conductive resin component is applied to the body.

As set forth above, according to the exemplary embodiments in the present disclosure, a predetermined level of capacitance of the multilayer capacitor may be secured, and the multilayer capacitor may have a decreased ESR, an improved warpage strength, and an improved reliability.

While exemplary embodiments have been shown and described above, it will be apparent to those skilled in the art that modifications and variations could be made without departing from the scope of the present invention, as defined by the appended claims.

What is claimed is:

1. A multilayer capacitor comprising:
   a body, including a plurality of first and second internal electrodes alternately stacked with dielectric layers interposed therebetween, having first and second surfaces opposing each other, third and fourth surfaces opposing each other and connected to the first and second surfaces, and fifth and sixth surfaces opposing each other, connected to the first and second surfaces, and connected to the third and fourth surfaces, and including a plurality of first and second groove portions in the third and fourth surfaces between dielectric layers, wherein the dielectric layers are perpendicular to the third and fourth surfaces, and end portions of the first and second internal electrodes are exposed from the body through the first and second groove portions, respectively;
   intermetallic compounds in the first and second groove portions and connected to the end portions of the first and second internal electrodes, respectively;
   moisture permeation prevention layers on the first and second surfaces of the body, respectively; and
   first and second external electrodes on the third and fourth surfaces of the body, respectively,
   wherein the first and second external electrodes include:
   conductive resin layers disposed on the third and fourth surfaces of the body, respectively, and including a plurality of metal particles, conductive connecting portions surrounding the plurality of metal particles and in contact with the intermetallic compounds, and base resin; and
   first electrode layers on the respective conductive resin layers and in contact with the conductive connecting portions, and
   wherein the moisture permeation prevention layers are each between the body and the conductive resin layers of the first and second external electrodes.

2. The multilayer capacitor of claim 1, wherein the conductive connecting portions include a material having a melting point lower than a hardening temperature of the base resin.

3. The multilayer capacitor of claim 2, wherein a melting point of the material of the conductive connecting portions is 300° C. or less.

4. The multilayer capacitor of claim 1, wherein the conductive connecting portions include two or more materials from a group consisting of tin, lead, indium, copper, silver, and bismuth.

5. The multilayer capacitor of claim 1, wherein the metal particles of the conductive resin layer include at least one material from a group consisting of copper, nickel, silver, copper coated with silver, and copper coated with tin.

6. The multilayer capacitor of claim 1, wherein the internal electrode includes nickel, and the intermetallic compound includes nickel-tin (Ni—Sn).

7. The multilayer capacitor of claim 1, wherein the internal electrode includes one material from a group consisting of nickel, copper, and palladium, or alloys thereof.

8. The multilayer capacitor of claim 1, wherein the metal particles of the conductive resin layer have spherical shapes, flake shapes, or a mixture of spherical shapes and flake shapes.

9. The multilayer capacitor of claim 1, further comprising moisture permeation prevention layers formed on the first and second surfaces of the body, respectively.

10. The multilayer capacitor of claim 1, wherein the first and second external electrodes respectively include connection portions on the third and fourth surfaces of the body, and each include band portions extending from the connection portions to the first, second, fifth, and sixth surfaces of the body.

11. The multilayer capacitor of claim 1, wherein the first electrode layer includes one material from a group consisting of copper, tin, nickel, palladium, and gold or alloys thereof.

12. The multilayer capacitor of claim 1, wherein the first and second external electrodes further include second electrode layers respectively on the first electrode layers.

13. The multilayer capacitor of claim 12, wherein the second electrode layers each include a nickel plating layer and a tin plating layer stacked sequentially on the first electrode layer.

14. The multilayer capacitor of claim 1, wherein the body further comprises upper and lower covers above and below the plurality of first and second internal electrodes, respectively, that include a material that is the same as that of the dielectric layers.

15. A multilayer capacitor comprising:
   a body, including a plurality of first and second internal electrodes alternately stacked with dielectric layers interposed therebetween, and having first and second surfaces opposing each other, third and fourth surfaces opposing each other and connected to the first and second surfaces, and fifth and sixth surfaces opposing each other, connected to the first and second surfaces, and connected to the third and fourth surfaces, wherein end portions of the first and second internal electrodes are exposed from the body at the third and fourth surfaces, respectively;
   intermetallic compounds connected to the end portions of the first and second internal electrodes, respectively;
   moisture permeation prevention layers on the first and second surfaces of the body, respectively; and
   first and second external electrodes on the third and fourth surfaces of the body, respectively,
   wherein the first and second external electrodes include:
   conductive resin layers on the third and fourth surfaces of the body, respectively, and including a plurality of metal particles, conductive connecting portions surrounding the plurality of metal particles and in contact with the intermetallic compounds, and base resin; and first electrode layers on the respective conductive resin layers and in contact with the conductive connecting portions, and wherein the moisture permeation prevention layers are each between the body and the conductive resin layers of the first and second external electrodes.

16. The multilayer capacitor of claim 15, wherein the conductive connecting portions include a material having a melting point lower than a hardening temperature of the base resin.

17. The multilayer capacitor of claim 16, wherein a melting point of the material of the conductive connecting portions is 300° C. or less.

18. The multilayer capacitor of claim 15, wherein the conductive connecting portions include two or more materials from a group consisting of tin, lead, indium, copper, silver, and bismuth.

19. The multilayer capacitor of claim 15, wherein the metal particles of the conductive resin layer include at least one material from a group consisting of copper, nickel, silver, copper coated with silver, and copper coated with tin.

20. The multilayer capacitor of claim 15, wherein the internal electrode includes nickel, and the intermetallic compound includes nickel-tin (Ni—Sn).

21. The multilayer capacitor of claim 15, wherein the internal electrode includes one material selected from a group consisting of nickel, copper, and palladium, or alloys thereof.

22. The multilayer capacitor of claim 15, wherein the metal particles of the conductive resin layer have spherical shapes, flake shapes, or a mixture of spherical shapes and flake shapes.

23. The multilayer capacitor of claim 15, wherein the first and second external electrodes respectively include connection portions on the third and fourth surfaces of the body, and each include band portions extending from the connection portions to the first, second, fifth, and sixth surfaces of the body.

24. The multilayer capacitor of claim 15, wherein the first electrode layer includes one material from a group consisting of copper, tin, nickel, palladium, and gold or alloys thereof.

25. The multilayer capacitor of claim 15, wherein the first and second external electrodes further include second electrode layers respectively on the first electrode layers.

26. The multilayer capacitor of claim 25, wherein the second electrode layers each include a nickel plating layer and a tin plating layer stacked sequentially on the first electrode layer.

27. The multilayer capacitor of claim 15, wherein the body further comprises upper and lower covers above and below the plurality of first and second internal electrodes, respectively, that include a material that is the same as that of the dielectric layers.

28. The multilayer capacitor of claim 15, wherein the first electrode layers are copper plating layers.

29. The multilayer capacitor of claim 28, wherein the conductive connecting portions include a material having a melting point lower than a hardening temperature of the base resin.

30. The multilayer capacitor of claim 29, wherein a melting point of the material of the conductive connecting portions is 300° C. or less.

31. The multilayer capacitor of claim 28, wherein the conductive connecting portions include two or more materials from a group consisting of tin, lead, indium, copper, silver, and bismuth.

32. The multilayer capacitor of claim 28, wherein the metal particles of the conductive resin layer include at least one material from a group consisting of copper, nickel, silver, copper coated with silver, and copper coated with tin.

33. The multilayer capacitor of claim 28, wherein the internal electrode includes nickel, and the intermetallic compound includes nickel-tin (Ni—Sn).

34. The multilayer capacitor of claim 28, wherein the internal electrode includes one material from a group consisting of nickel, copper, and palladium, or alloys thereof.

35. The multilayer capacitor of claim 28, wherein the metal particles of the conductive resin layer have spherical shapes, flake shapes, or a mixture of spherical shapes and flake shapes.

36. The multilayer capacitor of claim 28, further comprising moisture permeation prevention layers on the first and second surfaces of the body, respectively.

37. The multilayer capacitor of claim 28, wherein the first and second external electrodes respectively include connection portions on the third and fourth surfaces of the body, and each include band portions extending from the connection portions to the first, second, fifth, and sixth surfaces of the body.

38. The multilayer capacitor of claim 28, wherein the first and second external electrodes further include second electrode layers respectively on the first electrode layers.

39. The multilayer capacitor of claim 38, wherein the second electrode layers each include a nickel plating layer and a tin plating layer stacked sequentially on the first electrode layer.

40. The multilayer capacitor of claim 28, wherein the body further comprises upper and lower covers above and below the plurality of the first and second internal electrodes, respectively, that include a material that is the same as that of the dielectric layers.

41. A multilayer capacitor, comprising:
a body including a plurality of internal electrodes, wherein the plurality of internal electrodes are exposed from the body via a plurality of groove portions in a first surface of the body;
an external electrode electrically connected to the plurality of internal electrodes and including a conductive resin layer on the first surface of the body and a first electrode layer on the conductive resin layer; and
a moisture permeation prevention layer between the body and the conductive resin layer of the external electrode,
wherein the body includes intermetallic compounds in the plurality of groove portions and in contact with the respective plurality of internal electrodes, and
wherein the conductive resin layer includes a base resin and conductive connecting portions electrically connecting the first electrode layer to the intermetallic compounds in the plurality of groove portions.

42. The multilayer capacitor of claim 41,
wherein the conductive resin layer of the external electrode further includes a plurality of metal particles, and
wherein the conductive connecting portions surround the plurality of metal particles.

43. The multilayer capacitor of claim 41, wherein the conductive connecting portions include a material with a melting point lower than a hardening temperature of the base resin.

44. The multilayer capacitor of claim 41, further comprising a moisture permeation prevention layers respectively on second and third opposing surfaces of the body both connected to the first surface of the body.

45. A method of manufacturing a multilayer capacitor, comprising the steps of:
- forming a body by stacking and sintering a plurality of ceramic green sheets on which internal electrodes are printed;
- applying a conductive resin composite on opposing surfaces of the body to form a conductive resin layer, the conductive resin composite including first metal particles covered by oxide films, second metal particles comprising low melting point metal and covered by oxide films, and a base resin;
- removing the oxide films to allow the low melting point metal to flow within the conductive resin layer;
- forming a first electrode layer on the conductive resin layer.

46. The method of manufacturing a multilayer capacitor of claim 25, wherein a plurality of groove portions are formed in a first surface of the body and the low melting point metal flows into the plurality of groove portions.

47. The method of manufacturing a multilayer capacitor of claim 25, wherein sizes of the second metal particles are within a range from 0.2 µm to 20 µm.

48. The method of manufacturing a multilayer capacitor of claim 25, a melting point of the low melting point metal is 300° C. or less, and a hardening temperature of the base resin is higher than the melting point of the low melting point metal.

* * * * *